United States Patent [19]
Waletzky et al.

[11] Patent Number: 5,793,706
[45] Date of Patent: Aug. 11, 1998

[54] APPARATUS AND METHOD FOR CHASING ANIMALS FROM AN AUTOMOBILE

[76] Inventors: Lucy Waletzky, 1301 Bedford Rd., Pleasantville, N.Y. 10570; Peter J. Wilk, 185 W. End Ave., New York, N.Y. 10023

[21] Appl. No.: 783,826
[22] Filed: Jan. 13, 1997
[51] Int. Cl.$^6$ ............................ G10K 11/00; B60R 25/00
[52] U.S. Cl. ............................ 367/139; 116/22 A; 180/287
[58] Field of Search ............................ 367/139; 43/124; 116/22 A; 180/287

[56] References Cited

U.S. PATENT DOCUMENTS

| | | | |
|---|---|---|---|
| 4,413,261 | 11/1983 | Greenberg | 340/825.72 |
| 4,933,918 | 6/1990 | Landsrath et al. | 367/139 |
| 5,134,392 | 7/1992 | Takeuchi et al. | 340/825.69 |

Primary Examiner—Ian J. Lobo
Attorney, Agent, or Firm—R. Neil Sudol; Henry D. Coleman

[57] ABSTRACT

An apparatus for repelling animals from an automobile is mounted in an automobile having an engine compartment and an automotive battery. A generator for producing vibrations which can be sensed by animals is mounted in the engine compartment. The vibration generator is wired to the automotive battery for supplying electrical energy from the battery to the generator. A switch is connected to the vibration generator to switch the vibration generator between an activated state, in which the generator generates vibrations, and a deactivated state, in which the generator does not generate vibrations. The switch may be connected to the ignition of the automobile to deactivate the generator while the ignition is activated, and to activate the generator while the ignition is deactivated.

16 Claims, 1 Drawing Sheet

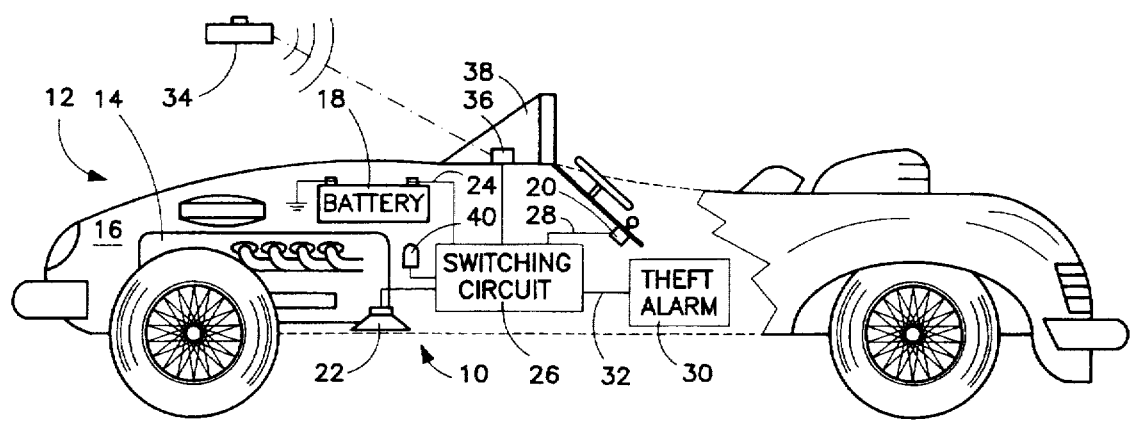

5,793,706

APPARATUS AND METHOD FOR CHASING ANIMALS FROM AN AUTOMOBILE

BACKGROUND OF THE INVENTION

This invention relates to an apparatus for preventing animals such as rodents from damaging automobile components. This invention further relates to an apparatus for preventing animals from being injured by an automobile in certain cases.

The sheltered warmth of an automobile engine compartment can be enticing to small animals seeking refuge against cold, rain, wind, or snow. The warm block of engine metal retains its heat for hours after a car has been driven, and the complex topography of the engine offers a variety of nesting places for a rodent. When the engine is started, the rodent may be injured or even killed. A rotting carcass in the engine compartment can introduce an unpleasant odor in the passenger compartment. Moreover, the car itself can suffer the wear of fine and powerful rodent incisors, nipping on wires and hoses crucial to the operation and safety of the vehicle.

Numerous schemes have been devised to divert unwanted pests from man's territory. In one technique, a generator of ultrasonic energy waves is provided in the home. The vibrations, silent to humans but painfully shrill to rodents, humanely force the flight of the pests. Nevertheless, an animal chased from a house is an animal more likely to seek refuge within a parked vehicle.

Little has been done to avert the damaging consequences of the incompatibility of cars and rodents. For those who care about the lives of the smallest of mammals, or who would not wish to find themselves stranded in an automobile incapacitated by the nighttime gnawing of resident rodents, a need exists to protect cars from rodents and rodents from cars.

OBJECTS OF THE INVENTION

It is an object of the invention to provide a system for averting rodent damage to automobiles, particularly to automobile components in engine compartments.

It is a further object of the invention to provide a system for preventing injury to small animals, particularly by automobile components in engine compartments.

In particular, it is an object of the invention to provide a system for chasing small animals from the vicinity of a car.

These and other objects of the present invention will be apparent from the drawings and detailed descriptions herein.

SUMMARY OF THE INVENTION

In an apparatus for chasing animals from an automobile according to the present invention, a generator is provided to produce vibrations which can be sensed by animals. An element is provided for mounting the generator to an automobile. Componentry is provided to operatively connect the generator to an automotive battery of the automobile to provide electrical energy from the battery to the generator. A switch is operatively connected to the generator for switching the generator between an activated state, in which the generator generates vibrations, and a deactivated state, in which the generator does not generate vibrations.

The switch may include an ignition-responsive element operatively connectable to the ignition of the automobile to deactivate the generator while the ignition is activated and to activate the generator while the ignition is deactivated.

The generator may be a generator of ultrasonic or audible sounds, or the generator may generate subsonic vibrations.

Where the automobile includes a theft alarm, the switch may include an alarm-responsive element operatively connectable to the theft alarm to activate the generator while the alarm is activated, and to deactivate the generator while the alarm is deactivated.

The switch may include a receiver of wireless signals. In that case, a remote control transmitter is provided for operating the switch in response to wireless signals transmitted from the transmitter to the receiver.

An animal-repellent automobile assembly according to the present invention includes an automobile having an engine compartment and an automotive battery. A generator for producing vibrations which can be sensed by animals is mounted in the engine compartment. Wiring componentry is operatively connected to the generator and the automotive battery for supplying electrical energy from the battery to the generator. A switch is operatively connected to the generator for switching the generator between an activated state, in which the generator generates vibrations, and a deactivated state, in which the generator does not generate vibrations.

The switch may include an ignition-responsive element operatively connectable to the ignition of the automobile to deactivate the generator while the ignition is activated and to activate the generator while the ignition is deactivated.

The generator may be a generator of ultrasonic or audible sounds, or the generator may generate subsonic vibrations.

Where the automobile includes a theft alarm, the switch may include an alarm-responsive element operatively connectable to the theft alarm to activate the generator while the alarm is activated, and to deactivate the generator while the alarm is deactivated.

The switch may include a receiver of wireless signals. In that case, a remote control transmitter is provided for operating the switch in response to wireless signals transmitted from the transmitter to the receiver.

In a method for chasing animals from an automobile according to the present invention, a generator of pressure waves is provided on the automobile. The generator is wired to an automotive battery of the automobile to provide electrical energy from the battery to the generator. A switch is operatively connected to the generator for switching the generator between an activated state, in which the generator generates pressure waves which can be sensed by animals, and a deactivated state, in which the generator does not generate pressure waves. The switch is operated so that the generator is activated while the automobile is in a parked state. The switch is subsequently operated so that the generator is deactivated while the automobile is in a driving state.

Where the automobile includes an ignition, the operation of the switch to activate the generator is performed automatically in response to deactivation of the ignition. The subsequent operation of the switch to deactivate the generator is performed automatically in response to activation of the ignition.

Where the automobile includes a theft alarm, the operation of the switch to activate the generator is performed automatically in response to activation of the theft alarm. The subsequent operation of the switch to deactivate the generator is performed automatically in response to deactivation of the theft alarm.

The generator may be a generator of ultrasonic or audible sounds, or the generator may generate subsonic vibrations.

In another conceptualization of a method according to the present invention for chasing animals from an automobile, a generator of waveform energy is provided on an automobile. The generator is wired to an automotive battery of the automobile to provide electrical energy from the battery to the generator. A switch is operatively connected to the generator for switching the generator between an activated state, in which the generator generates waveform energy which can be sensed by animals, and a deactivated state, in which the generator does not generate waveform energy. The switch is operated so that the generator is activated while the automobile is in a parked state. Subsequently, the switch is operated so that the generator is deactivated while the automobile is in a driving state. The generator may be a generator of pressure waves, or the generator may be strobe light source.

A method or apparatus according to the present invention causes animals to flee from the vicinity of an engine compartment and accordingly reduces the risk of harm coming to the animals and to the engine components.

BRIEF DESCRIPTION OF THE DRAWINGS

The sole figure is a schematic illustration of an automobile including an apparatus for chasing animals in accordance with the present invention.

DETAILED DESCRIPTION OF THE INVENTION

An apparatus 10 for chasing away animals such as rodents is mounted on an automobile 12. Automobile 12 includes conventional automobile elements such as an engine 14 mounted in an engine compartment 16, an automotive battery 18, and an ignition switch 20. The term "automobile" is used herein to include cars, trucks, vans, buses, minivans, ATVs, RVs, and related forms of ground transport.

Animal-chasing apparatus 10 includes a vibration generator 22. Vibration generator 22 is mounted on automobile 12, preferably in engine compartment 16, and is powered through a power lead 24 by automotive battery 18. Current supplied to vibration generator 22 through power lead 24 is switched by a switching circuit 26. Switching circuit 26 is operative to switch the generator between an activated state, in which current is supplied to generator 22 so that generator 22 generates vibrations, and a deactivated state, in which current is cut off from generator 22, so that generator 22 does not generate vibrations.

Vibrations are generated by generator 22 at one or more amplitudes and frequencies which can be sensed by animals and which repel animals. For example, generator 22 may be a speaker generating ultrasonic, audible (i.e., audible to humans), or subsonic pressure waves through the air and/or the structural material of automobile 12. Examples of audible pressure waves emitted by generator 22 include recordings of or synthesized sounds imitating humans, birds, and other creatures which pose a threat to the life of rodents. Upon hearing such noises, a rodent seeking shelter in engine compartment 16 or elsewhere in automobile 12 will believe itself threatened by one of these creatures and will flee the vicinity of animal-chasing apparatus 10.

Subsonic vibrations from vibration generator 22 may be produced by an oscillating electromagnetic actuator, an eccentric rotor, or other electromechanical means to shake automobile 12 with low-frequency vibrations which elicit fear in animals and lead to their escape.

It is well known that ultrasonic vibrations are unpleasant to rodents. Where it is desirable to chase away rodents with ultrasonic vibrations, vibration generator 22 may include a piezoelectric transducer for the generation of ultrasonic pressure waves.

Switching circuit 26 may include an ignition sensor lead 28 attached to ignition switch 20. Switching circuit 26 detects through ignition sensor lead 28 whether ignition switch 20 is on or off. Ignition switch 20, battery 18, and engine 14 are wired together in a conventional manner. When switching circuit 26 detects that ignition switch 20 is in the off position, switching circuit 26 activates vibration generator 22. Conversely, when switching circuit 26 detects that ignition switch 20 is in the on position, switching circuit 26 deactivates vibration generator 22. When automobile 12 is in a parked state, ignition switch 20 is in the off position in accordance with standard automobile driving procedure, and vibration generator 22 is active to scare away animals. When automobile 12 is in a driving state, ignition 20 is in the on position in accordance with standard automobile driving procedure, and vibration generator 22 is deactivated. Because animals are only likely to seek refuge in automobile 12 while the latter is in a parked state, the connection of switching circuit 26 with ignition switch 20 automatically ensures that vibration generator 22 is activated only when it is most needed, in the parked state.

In an alternative system for automatically activating vibration generator 22 while automobile 12 is in a parked state, automobile 12 is provided with a theft alarm 30. Switching circuit 26 includes an alarm detection lead 32 attached to theft alarm 30. When alarm 30 is activated, switching circuit 26 activates vibration generator 22. When alarm 30 is deactivated, switching circuit 26 deactivates vibration generator 22. Automotive theft alarm 30 is activated only when automobile 12 is in a parked state. Accordingly, vibration generator 22 is likewise activated only when automobile 12 is in a parked state.

In addition to automatic control of animal-chasing apparatus 10, manual control of switching circuit 26 may be provided, for example by means of a wireless remote control transmitter 34 and complementary receiver 36. Transmitter 34 and receiver 36 may communicate following any conventional remote control protocol using radio or infrared signals. Receiver 36 is preferably positioned near a windshield 38 or other window of automobile 12 because of enhanced transparency to infrared and radio signals. In addition to or as an alternative to vibration generator 22, a light source of varying intensity, for example a strobe light such as a xenon flash tube 40, may be provided to frighten rodents or other animals in the engine compartment and cause them to flee. Strobe light 40 is wired to switching circuit 26 to be activated and deactivated as described above with respect to vibration generator 22. Strobe 40, when activated, periodically emits flashes of light.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof

What is claimed is:

1. An apparatus for chasing animals from an automobile, comprising:

a generator for producing vibrations which can be sensed by animals;

means for mounting said generator to an automobile having an ignition; means operatively connected to said generator for attaching said generator to an automotive battery of said automobile to provide electrical energy from said battery to said generator; and switching means operatively connected to said generator for switching said generator between an activated state, in which said generator generates vibrations, and a deactivated state, in which said generator does not generate vibrations, said switching means including an ignition-responsive means operatively connectable to the ignition of said automobile to deactivate said generator while the ignition is activated, and to activate said generator while the ignition is deactivated.

2. The apparatus defined in claim 1 wherein said generator is an ultrasonic sound generator.

3. The apparatus defined in claim 1 wherein said generator is an audible sound generator.

4. The apparatus defined in claim 1 wherein said switching means includes a receiver of wireless signals, further comprising a remote control transmitter for operating said switching means in response to wireless signals transmitted from said transmitter to said receiver.

5. An animal-repellent automobile assembly comprising:

an automobile having an engine compartment an ignition and an automotive battery;

a generator for producing vibrations which can be sensed by animals, said generator being mounted in said engine compartment;

wiring means operatively connected to said generator and said automotive battery for supplying electrical energy from said battery to said generator; and switching means operatively connected to said generator for switching said generator between an activated state, in which said generator generates vibrations, and a deactivated state, in which said generator does not generate vibrations, said switching means including an ignition-responsive means operatively connected to the ignition of said automobile to deactivate said generator while the ignition is activated, and to activate said generator while the ignition is deactivated.

6. The assembly of claim 5 wherein said generator is an ultrasonic sound generator.

7. The assembly of claim 5 wherein said generator is an audible sound generators.

8. The assembly of claim 5 wherein said switching means includes a receiver of wireless signals, further comprising a remote control transmitter for operating said switching means in response to wireless signals transmitted from said transmitter to said receiver.

9. A method for chasing animals from an automobile, comprising:

providing a generator of pressure waves on an automobile, said generator being wired to an automotive battery of said automobile to provide electrical energy from said battery to said generator;

further providing a switch operatively connected to said generator for switching said generator between an activated state, in which said generator generates pressure waves which can be sensed by animals, and a deactivated state, in which said generator does not generate pressure waves;

operating said switch so that said generator is activated while said automobile is in a parked state; and subsequently operating said switch so that said generator is deactivated while said automobile is in a driving state, the operating of said switch including automatically activating said generator in response to a deactivation of said ignition, said step of subsequently operating said switch including automatically deactivating said generator in response to an activation of said ignition.

10. The method of claim 9 wherein said generator is an ultrasonic sound generator.

11. The method of claim 9 wherein said generator is an audible sound generator.

12. A method for chasing animals from an automobile, comprising:

providing a waveform energy generator in the form of a strobe light source on an automobile having an ignition, said generator being wired to an automotive battery of said automobile to provide electrical energy from said battery to said generator;

further providing a switch operatively connected to said generator for switching said generator between an activated state, in which said generator generates waveform energy which can be sensed by animals, and a deactivated state, in which said generator does not generate waveform energy;

operating said switch so that said generator is activated while said automobile is in a parked state; and subsequently operating said switch so that said generator is deactivated while said automobile is in a driving state, the operating of said switch including automatically activating said generator in response to a deactivation of said ignition, said step of subsequently operating said switch including automatically deactivating said generator in response to an activation of said ignition.

13. An apparatus for chasing animals from an automobile, comprising:

a generator for producing vibrations which can be sensed by animals;

means for mounting said generator to an automobile having a theft alarm;

means operatively connected to said generator for attaching said generator to an automotive battery of said automobile to provide electrical energy from said battery to said generator; and switching means operatively connected to said generator for switching said generator between an activated state, in which said generator generates vibrations, and a deactivated state, in which said generator does not generate vibrations, said switching means including an alarm-responsive means operatively connectable to said theft alarm to activate said generator while said alarm is activated, and to deactivate said generator while said alarm is deactivated.

14. An animal-repellent automobile assembly comprising:

an automobile having an engine compartment, an automotive battery and a theft alarm;

a generator for producing vibrations which can be sensed by animals, said generator being mounted in said engine compartment;

wiring means operatively connected to said generator and said automotive battery for supplying electrical energy from said battery to said generator; and switching means operatively connected to said generator for switching said generator between an activated state, in which said generator generates vibrations, and a deactivated state, in which said generator does not generate vibrations, said switching means including an alarm-responsive means operatively connected to said theft alarm to activate said generator while said alarm is activated, and to deactivate said generator while said alarm is deactivated.

15. A method for chasing animals from an automobile, comprising:

providing a generator of pressure waves on an automobile having a theft alarm, said generator being wired to an automotive battery of said automobile to provide electrical energy from said battery to said generator;

further providing a switch operatively connected to said generator for switching said generator between an activated state, in which said generator generates pressure waves which can be sensed by animals, and a deactivated state, in which said generator does not generate pressure waves;

operating said switch so that said generator is activated while said automobile is in a parked state; and subsequently operating said switch so that said generator is deactivated while said automobile is in a driving state, said step of operating said switch including automatically activating said generator in response to an activation of said theft alarm, said step of subsequently operating said switch including automatically deactivating said generator in response to a deactivation of said theft alarm.

16. A method for chasing animals from an automobile, comprising:

providing a waveform energy generator in the form of a strobe light source on an automobile having a theft alarm, said generator being wired to an automotive battery of said automobile to provide electrical energy from said battery to said generator;

further providing a switch operatively connected to said generator for switching said generator between an activated state, in which said generator generates waveform energy which can be sensed by animals, and a deactivated state, in which said generator does not generate waveform energy;

operating said switch so that said generator is activated while said automobile is in a parked state; and subsequently operating said switch so that said generator is deactivated while said automobile is in a driving state, the operating of said switch including automatically activating said generator in response to an activation of said theft alarm, said step of subsequently operating said switch including automatically deactivating said generator in response to a deactivation of said theft alarm.

* * * * *